(12) United States Patent
Tsumagari et al.

(10) Patent No.: US 7,594,076 B2
(45) Date of Patent: Sep. 22, 2009

(54) DISK ARRAY APPARATUS, DATA MIGRATION METHOD, AND STORAGE MEDIUM

(75) Inventors: Masahiro Tsumagari, Odawara (JP); Haruaki Watanabe, Isehara (JP); Takao Satoh, Odawara (JP)

(73) Assignee: Hitachi, Ltd., Tokyo (JP)

( * ) Notice: Subject to any disclaimer, the term of this patent is extended or adjusted under 35 U.S.C. 154(b) by 643 days.

(21) Appl. No.: 11/328,286

(22) Filed: Jan. 10, 2006

(65) Prior Publication Data
US 2007/0061513 A1 Mar. 15, 2007

(30) Foreign Application Priority Data
Sep. 9, 2005 (JP) ............................. 2005-262318

(51) Int. Cl.
*G06F 12/12* (2006.01)
(52) U.S. Cl. ...................................... 711/114; 711/112
(58) Field of Classification Search .................. 711/114
See application file for complete search history.

(56) References Cited
U.S. PATENT DOCUMENTS
6,748,487 B1 * 6/2004 Takamoto et al. ........... 711/113

2004/0194055 A1 * 9/2004 Galloway et al. ........... 717/101
2006/0112221 A1 * 5/2006 Hu et al. ..................... 711/114

FOREIGN PATENT DOCUMENTS
JP 2003-140836 5/2003

\* cited by examiner

*Primary Examiner*—Hyung S Sough
*Assistant Examiner*—Hamdy S Ahmed
(74) *Attorney, Agent, or Firm*—Antonelli, Terry, Stout & Kraus, LLP.

(57) ABSTRACT

The disk array apparatus has a source volume that is the source for data migration, and migrates the data to a destination volume that is the destination for the data migration. The disk array apparatus includes: an access frequency calculator for calculating the frequency of access to the source volume for each time period of a certain length of time going back from a data migration termination date and time when the data migration termination date and time is designated externally; an estimated data migration amount calculator for calculating the estimated data migration amount for each time period based on the access frequency calculated by the access frequency calculator; and a data migration start date and time calculator for calculating the data migration start date and time based on the estimated data migration amount calculated by the estimated data migration amount calculator.

13 Claims, 14 Drawing Sheets

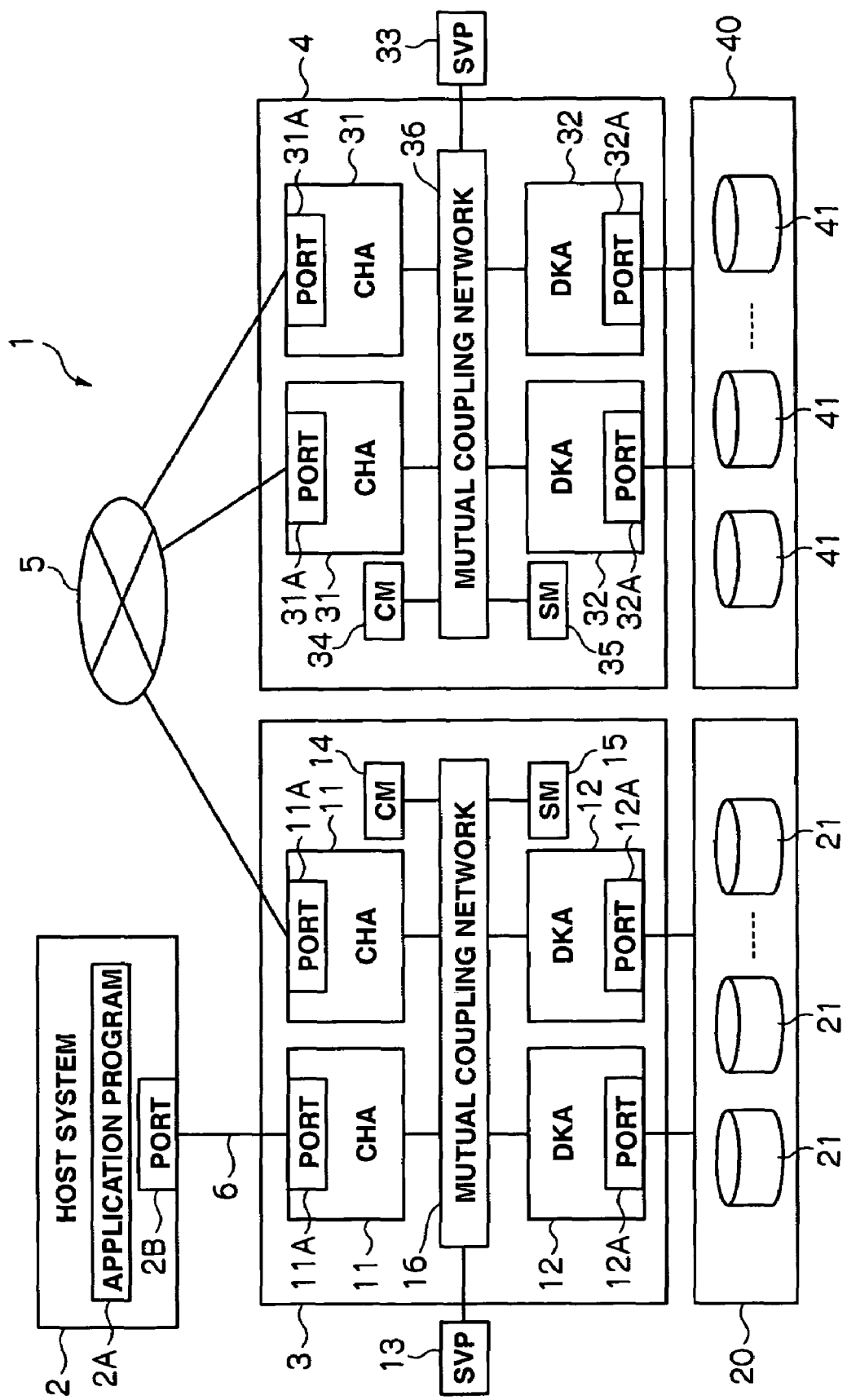

FIG.2

| | |
|---|---|
| INTERNAL TIMER | 50 |
| READ I/O COUNTER | 51 |
| WRITE I/O COUNTER | 52 |
| DATA MIGRATION PACE TABLE | 60 |
| I/O COUNT TABLE | 70 |
| DATA MIGRATION AMOUNT TABLE | 80 |
| TIME AND DATE TABLE | 90 |
| LOGICAL UNIT INFORMATION DATABASE | 110 |
| DATA MIGRATION AMOUNT INFORMATION DATABASE | 120 |
| I/O COUNT INFORMATION DATABASE | 140 |
| DATA MIGRATION START DATE AND TIME INFORMATION DATABASE | 150 |

| DATA MIGRATION PACE (61) | DATA MIGRATION PACE CODE (62) |
|---|---|
| 10 | 0x00000001 |
| 20 | 0x00000002 |
| . | . |
| . | . |
| . | . |
| 50 | 0x00000005 |
| 60 | 0x00000006 |

| I/O COUNT | I/O COUNT CODE |
|---|---|
| 0～100 | 1 |
| 101～200 | 2 |
| . | . |
| . | . |
| . | . |
| 1801～1900 | 19 |
| 1901～2000 | 20 |

| DATA MIGRATION AMOUNT | DATA MIGRATION AMOUNT CODE |
|---|---|
| 0～10 | 1 |
| 11～20 | 2 |
| . | . |
| . | . |
| . | . |
| 299981～299990 | 29999 |
| 299991～300000 | 30000 |

| DATE | DATA CODE | START DATE AND TIME TIME | TIME CODE | DATE | DATA CODE | TERMINATION DATE AND TIME TIME | TIME CODE |
|---|---|---|---|---|---|---|---|
| 1 | 1 | 0 | 0 | 1 | 1 | 0 | 0 |
| 2 | 2 | 1 | 1 | 2 | 2 | 1 | 1 |
| . | . | . | . | . | . | . | . |
| . | . | . | . | . | . | . | . |
| . | . | . | . | . | . | . | . |
| 30 | 30 | 22 | 22 | 30 | 30 | 22 | 22 |
| 31 | 31 | 23 | 23 | 31 | 31 | 23 | 23 |

DISK ARRAY APPARATUS, DATA MIGRATION METHOD, AND STORAGE MEDIUM

CROSS-REFERENCES TO RELATED APPLICATIONS

This application relates to and claims priority from Japanese Patent Application No. 2005-262318, filed on Sept. 9, 2005, the entire disclosure of which is incorporated herein by reference.

BACKGROUND OF THE INVENTION

The present invention relates to a disk array apparatus, a data migration method, and a storage medium, and is preferably applied to, for example, a storage system for migrating data between a plurality of disk array apparatuses.

Because of an explosive increase in the use of data by companies in recent years, storage systems that store large volumes of data by mutually connecting a plurality of disk array apparatuses via, for example, a SAN (Storage Area Network) have come into wide use.

In such storage systems, an information processor for managing a plurality of disk array apparatuses is used to optimize data arrangement in each disk array apparatus.

As a storage system for optimizing data arrangement, JP-A-2003-140836, for example, suggests a storage system that has an information processor acquire manufacturer information and usage-state information for each disk array apparatus, and migrates data between storage areas in the individual disk array apparatuses and between storage areas in the respective disk array apparatuses, based on the manufacturer information and the usage-state information.

Lately the concept of Data Lifecycle Management (DLCM) has been proposed in the field of storage systems. The concept of DLCM is to retain and manage data efficiently by focusing attention on the fact that the value of data changes over time.

In the DLCM, for example, storing data of diminished value in expensive storage devices is a waste of storage resources. Accordingly, such data with diminished value is migrated to inexpensive storage devices that are inferior to other, expensive storage devices in reliability, responsiveness, and durability.

If in such a storage system the data stored in storage areas in expensive storage devices are migrated to inexpensive storage devices at designated dates and times at regular intervals, for example, every week or every month, ideally the data migration is completed at that designated date and time as much as possible.

However, in order to terminate the data migration at the designated date and time, there is the problem of difficulty in estimating migration start time due to factors such as a transfer speed during the data migration. As a result, it is difficult to terminate the data migration at the designated time.

Since it is difficult to terminate the data migration at the designated time as described above, a user has to estimate the migration termination time and set the migration start time, making the required operation cumbersome and complicated. At the same time, assuming the possibility of the termination of data migration failing, a user needs to prepare spare storage areas in expensive storage devices. Therefore, there is a problem in that the expensive storage devices cannot be used efficiently.

SUMMARY OF THE INVENTION

The present invention has been made in consideration of the above-described problems in the known art. This invention proposes a disk array apparatus, a data migration method, and a storage medium that can dramatically enhance operability of the disk array apparatus.

In order to solve the above-described problems, according to an aspect of this invention, the following apparatus is provided: a disk array apparatus having a source volume that is the source for data migration, wherein the disk array apparatus migrates the data to a destination volume that is the destination for the data migration. The disk array apparatus includes: an access frequency calculator for calculating the frequency of access to the source volume for each time period of a certain length of time going back from a data migration termination date and time when the data migration termination date and time is designated externally; an estimated data migration amount calculator for calculating an estimated data migration amount for each time period based on the access frequency calculated by the access frequency calculator; and a data migration start date and time calculator for calculating a data migration start date and time based on the estimated data migration amount calculated by the estimated data migration amount calculator.

Accordingly, a user does not have to set the data migration start date and time by guessing the data migration termination date and time. The user only has to designate the data migration termination date and time so that the data migration start date and time can be set so as to terminate the data migration at that data migration termination date and time.

Moreover, according to another aspect of this invention, the following method is provided: a data migration method for a disk array apparatus having a source volume that is the source for data migration, wherein the disk array apparatus migrates the data to a destination volume that is the destination for the data migration. The data migration method includes: a first step of calculating the frequency of access to the source volume for each time period of a certain length of time going back from a data migration termination date and time when the data migration termination date and time is designated externally; a second step of calculating an estimated data migration amount for each time period based on the access frequency calculated in the first step; and a third step of calculating data a migration start date and time based on the estimated data migration amount calculated in the second step.

Accordingly, a user does not have to set the data migration start date and time by guessing the data migration termination date and time. The user only has to designate the data migration termination date and time so that the data migration start date and time can be set so as to terminate the data migration at that data migration termination date and time.

Furthermore, according to a further aspect of this invention, the following storage medium is provided: a storage medium for storing a program for a disk array apparatus wherein the disk array apparatus has a source volume that is the source for data migration, and the disk array apparatus migrates the data to a destination volume that is the destination for the data migration. The program makes the disk array apparatus execute: a first step of calculating the frequency of access to the source volume for each time period of a certain length of time going back from a data migration termination date and time when the data migration termination date and time is designated externally; a second step of calculating an estimated data migration amount for each time period based on the access frequency calculated in the first step; and a third step of calculating data migration start date and time based on the estimated data migration amount calculated in the second step.

Accordingly, a user does not have to set the data migration start date and time by guessing the data migration termination date and time. The user only has to designate the data migration termination date and time so that the data migration start date and time can be set so as to terminate the data migration at that data migration termination date and time.

According to the various aspects of this invention, when the data migration termination date and time is designated externally, access frequency to the source volume is calculated for each time period of a certain period of time going back from the data migration termination date and time; based on that access frequency, an estimated data migration amount for each time period is calculated; and based on that estimated data migration amount, a data migration start date and time is calculated. Therefore, a user does not have to set the data migration start date and time by guessing the data migration termination date and time. Instead, the user only has to designate the data migration termination date and time so that the data migration start date and time can be set to enable the termination of data migration at that designated data migration termination date and time. Consequently, it is possible to realize a disk array apparatus, a data migration method, and a storage medium that can dramatically enhance the operability of the disk array apparatus.

BRIEF DESCRIPTION OF THE DRAWINGS

FIG. 1 is a schematic diagram illustrating the configuration of a storage system according to an embodiment of this invention.

FIG. 2 is a schematic diagram illustrating a configuration with shared memory.

FIG. 3 is a conceptual diagram of a data migration pace table.

DETAILED DESCRIPTION OF THE INVENTION

Figure 4:
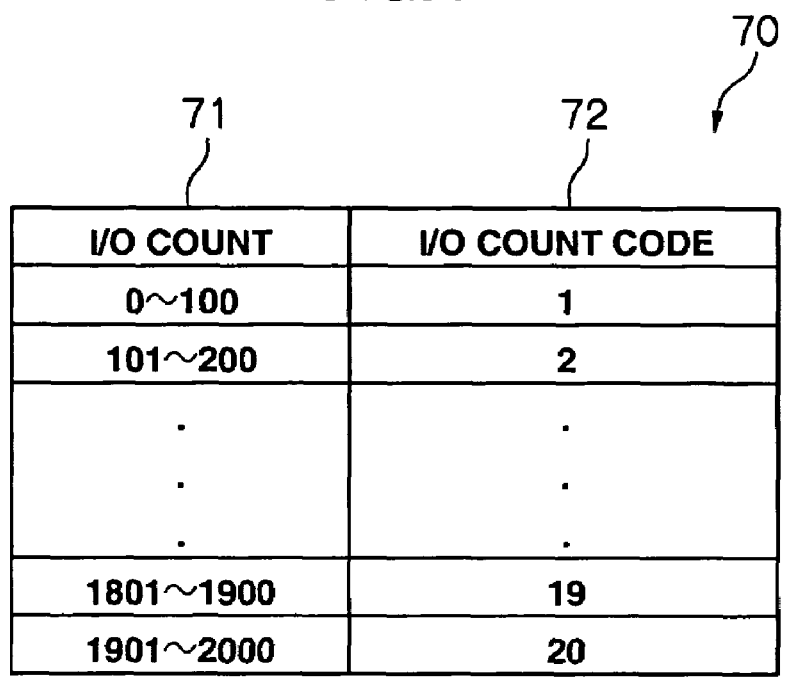
FIG. 4 is a conceptual diagram of an I/O count table.

An embodiment of this invention is described below in detail with reference to the attached drawings.

(1) Configuration of the Storage System According to this Embodiment

FIG. 1 shows the system configuration of a storage system 1 according to this embodiment. The storage system 1 includes a host system 2, a first storage controller 3, and a second storage controller 4 and is designed to perform data processing in response to commands from the host system 2. The first storage controller 3 and the second storage controller 4 are connected to each other via a communication network 5 and may be installed either at the same site or separately at different sites.

The host system 2 is a host system equipped with a CPU (Central Processing Unit) and memory. Specifically, the host system 2 is a personal computer, a workstation, or a mainframe. Moreover, the host system 2 contains application programs 2A and is equipped with a port 2B for access to the first storage controller 3 via a second communication network 6. Examples of the application programs 2A include: application programs for databases or the like that utilize storage resources provided by the first storage controller 3; and management application programs for managing the storage resources of the first storage controller 3.

The host system 2 and the first storage controller 3 are connected to each other via a second communication network 6. As the communication network 6, it is possible to use a LAN (Local Area Network), a SAN (Storage Area Network), the Internet, private lines, or public lines, which can be selected and used as appropriate. Data communication via a LAN is conducted according to, for example, TCP/IP (Transmission Control Protocol/Internet Protocol). If the host system 2 is connected to the first storage controller 3 via a LAN, the host system 2 requests data input or output in files by designating file names. On the other hand, if the host system 2 is connected to the first storage controller 3 via a SAN, the host system 2 requests data input or output in blocks, which are the data management units for storage resources provided by a plurality of disk drives according to Fibre Channel Protocol. When the second communication network is a LAN, the port 2B is, for example, a LAN network card. If the second communication network 6 is a SAN, the port 2B is, for example, an HBA (Host Bus Adapter).

The first storage controller 3 includes a plurality of channel adapters (CHA) 11, a plurality of disk adapters (DKA) 12, a management terminal (SVP) 13, cache memory (CM) 14, shared memory (SM) 15, and a mutual coupling network 16. Each channel adapter 11 is configured as a microcomputer system including, for example, a microprocessor (MP) and internal memory, and is equipped with ports 11A for data communication with the host system 2. The channel adapters 11 interpret and execute various kinds of commands sent from the host system 2. The channel adapters 11 are given unique network addresses such as an Internet Protocol (IP) address or a World Wide Name (WWN). Each channel adapter 11 can individually act as NAS (Network Attached Storage). When a plurality of host systems 2 exists, each channel adapter 11 can individually accept requests from each host system 2.

Each disk adapter 12 sends and receives data to and from the storage devices 21 of a storage unit 20. The disk adapter 12 has a port 12A for connection with the storage devices 21. Each disk adapter 12 writes data received from the host system 2 by the channel adapter 11 to a specified address in the storage devices 21 in accordance with write commands from the host system 2. Each disk adapter 12 also reads data from specified addresses in the storage devices 21 in accordance with read commands from the host system 2, and sends the data to the host system 2. When reading or writing data from/to the storage devices 21, each disk adapter 12 converts logical addresses to physical addresses. If the storage devices 21 are managed according to RAID (Redundant Arrays of Independent/inexpensive Disks) or ECC (Error Correcting Code), each disk adapter 12 makes data access according to the relevant RAID or ECC configuration.

The management terminal 13 is a terminal device for maintaining or managing the first storage controller 3. By operating the management terminal 13, a maintenance person can, for example, set logical devices defined on the storage devices 21, increase or decrease the number of storage devices 21, or change the settings of the RAID or ECC group configuration (for example, change from RAID 5 to RAID 1).

The cache memory 12A temporarily stores data received from the host system 2 and read from the storage devices 21. The shared memory 15 stores, for example, various kinds of control information necessary for system management.

The mutual coupling network 16 mutually connects the channel adapters 11, the disk adapters 12, the management terminal 13, the cache memory 14, and the shared memory 15. The mutual coupling network 16 can be composed as, for example, a high-speed bus such as a very high speed crossbar switch that transfers data by a high-speed switching action.

The storage unit 20 includes a plurality of storage devices 21. As these storage devices 21, expensive disk drives such as SCSI (Small Computer System Interface) disks or Fibre Channel disk drives can be used. The storage unit 20 is configured by arranging a plurality of storage devices 21 in arrays. At least one or more logical units (LU) (or logical volumes) are formed in physical storage areas provided by the group of storage devices 21. These logical units are provided to the host system 2.

FIG. 1 illustrates an example in which the host system 2 is connected only to the first storage controller 3 via the second communication network 6. However, the host system 2 and the second storage controller 4 may be connected to each other via the first communication network 5. The first communication network 5 is, for example, a SAN, a LAN, the Internet, private lines, or public lines. The second storage controller 4 includes: a plurality of channel adapters (CHA) 31, a plurality of disk adapters (DKA) 32, a management terminal (SVP) 33, cache memory (CM) 34, shared memory (SM) 35, and a mutual coupling network 36.

Each channel adapter (CHA) 31 has a port 31A for connection to the first communication network 5. Each disk adapter (DKA) 32 has a port 41 A for connection to the storage devices 41. The storage unit 40 includes a plurality of storage devices 41. As these storage devices 41, inexpensive disk drives such as SATA (Serial AT Attachment) disks or optical disks are used. Since the second storage controller 4 is configured in a manner similar to the first storage controller 3, a detailed description of the configuration of the second storage controller 4 is omitted.

The shared memory 15 contains, as shown in FIG. 2, an internal timer 50, a read I/O (Input/Output) counter 51, a write I/O counter 52, a data migration pace table 60, an I/O count table 70, a data migration amount table 80, a date and time table 90, a logical unit information database 110, a data migration amount information database 120, an I/O count information database 140, and a data migration start date and time information database 150.

The internal timer 50 can record, for example, the current date and time, data migration start date and time, and data migration termination date and time. The read I/O counter 51 can count read I/Os to logical units or ECC groups. The write I/O counter 52 can count write I/Os to logical units or ECC groups.

Referring to FIG. 3, the data migration pace table 60 includes: a data migration pace storage field 61 showing the pace at which data is migrated per hour; and a data migration pace code storage field 62 corresponding to the data migration pace storage field 61. The data migration pace per hour can be converted into a data migration pace code.

Referring to FIG. 4, the I/O counter table 70 includes: an I/O count storage field 71 showing the number of read I/Os and write I/Os per hour to logical units or ECC groups; and an I/O count code storage field 72 corresponding to the I/O count storage field 71. The per-hour read I/O count and write I/O count to the logical units or the ECC groups can be converted into an I/O count code.

Figure 5:
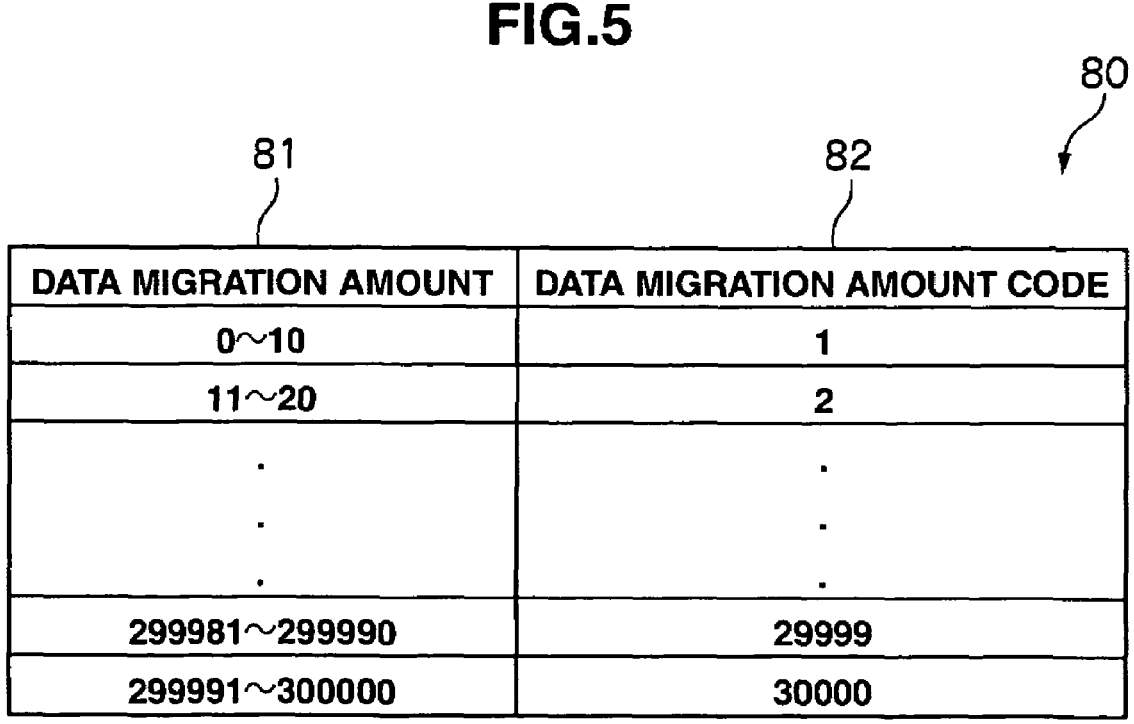
FIG. 5 is a conceptual diagram of a data migration amount table.

Now referring to FIG. 5, the data migration amount table 80 includes: a data migration amount storage field 81 that shows the data migration amount per hour when data is migrated from a data-outputting logical unit (hereinafter referred to as the "source logical unit") to a logical unit to which data should be input (hereinafter referred to as the "destination logical unit"); and a data migration amount code storage field 82 corresponding to the data migration amount storage field 81. The data migration amount per hour can be converted into a data migration amount code.

Figures 6, 7:
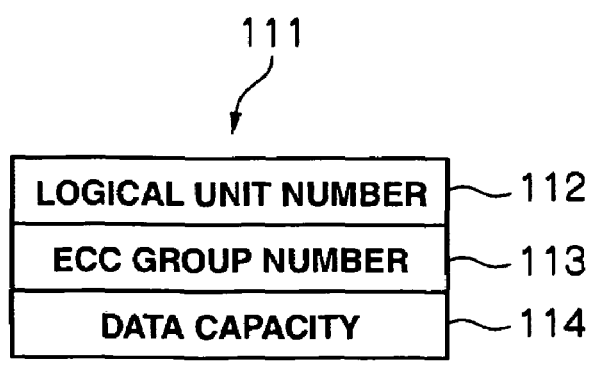
FIG. 6 is a conceptual diagram of a date and time table.
FIG. 7 is a conceptual diagram explaining a logical unit information database.
Figure 8:
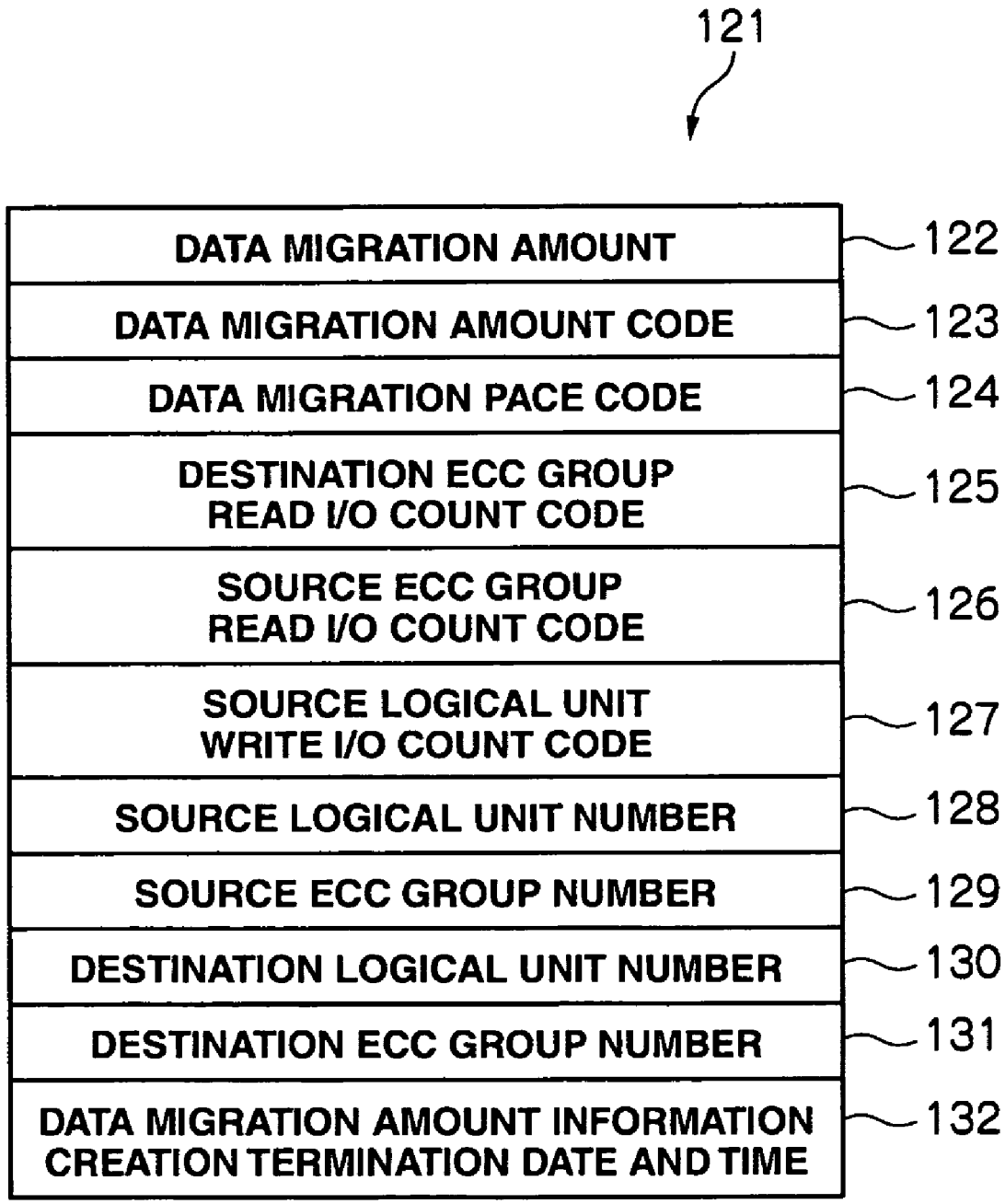
FIG. 8 is a conceptual diagram explaining a data migration amount information database.
Figure 9:
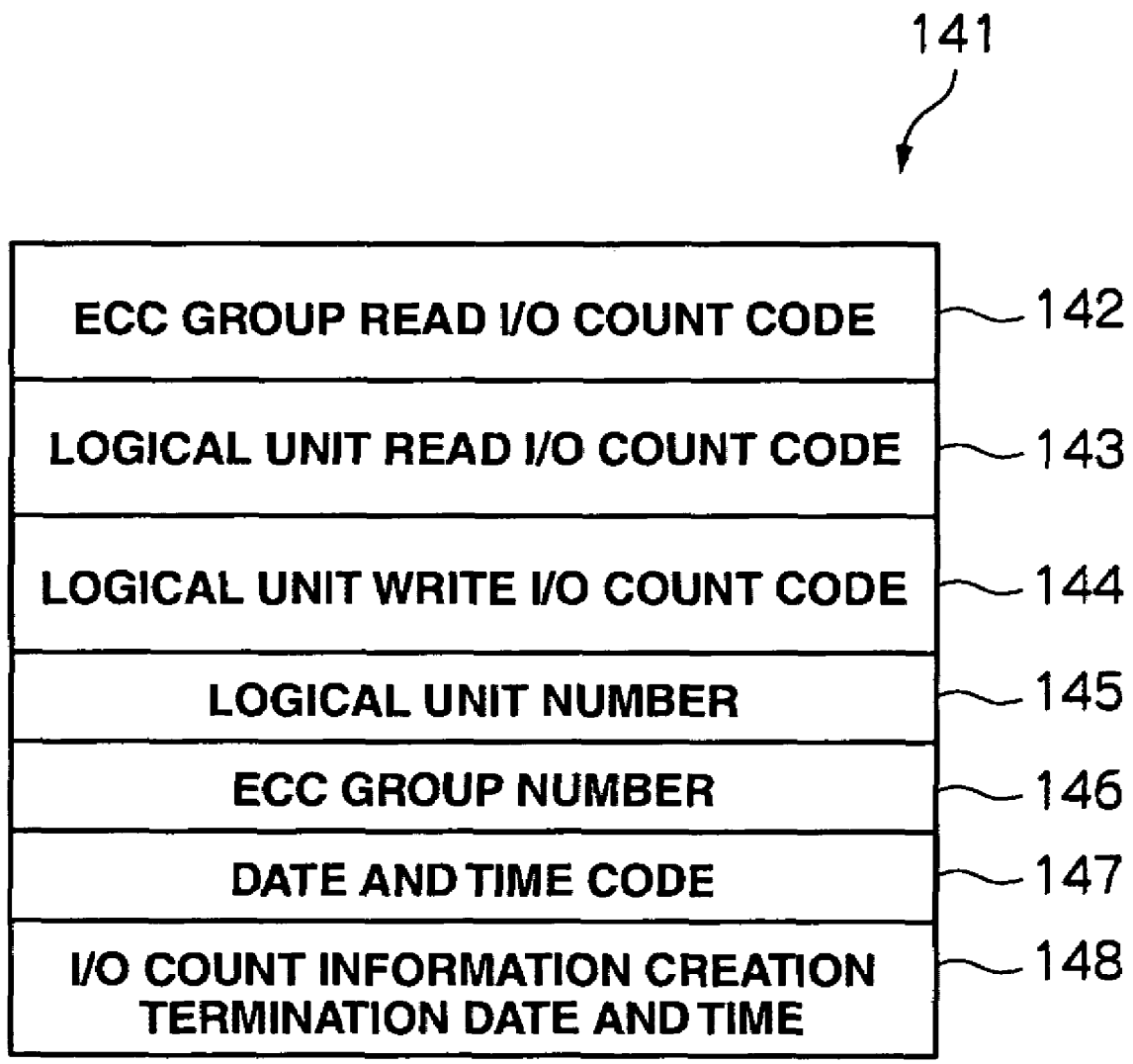
FIG. 9 is a conceptual diagram explaining an I/O count information database.
Figure 10:
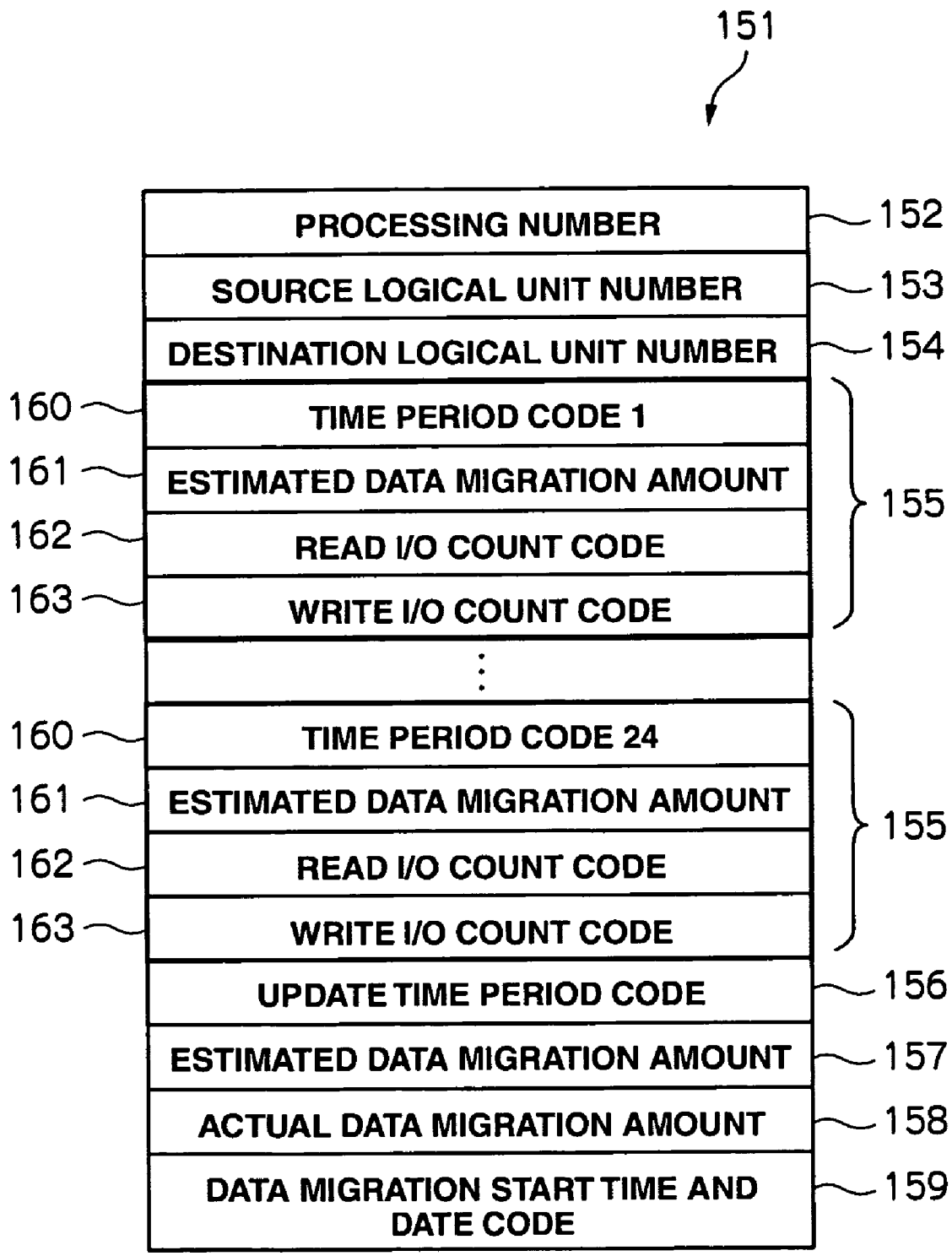
FIG. 10 is a conceptual diagram explaining a data migration start information database.

Referring to FIG. 6, the date and time table 90 includes: a start date and time storage field 91 that shows start dates and times; and a termination date and time storage field 92 that shows termination dates and times.

The start date and time storage field 91 includes: a start date storage field 93 showing start dates; a start date code storage field 94 corresponding to the start date storage field 93; a start time storage field 95 showing start times; and a start time code storage field 96 corresponding to the start time storage field 95. The start date and the start time can be converted into a start date code and a start time code.

The termination date and time storage field 92 includes: a termination date storage field 97 showing termination dates; a termination date code storage field 98 corresponding to the termination date storage field 97; a termination time storage field 99 showing termination times; and a termination time code storage field 100 corresponding to the termination time storage field 99. The termination date and the termination time can be converted into a termination date code and a termination time code.

Now as shown in FIG. 7, the logical unit information database 110 is configured by storing logical unit information 111 for each logical unit provided in storage areas in the storage devices 21 in the storage unit 20.

This logical unit information 111 includes: a logical unit number 112 that is the number of the relevant logical unit; an ECC group number 113 that is the number of the ECC group to which the relevant logical unit belongs; and a data capacity 114 that is the data capacity of the relevant logical unit. The logical unit number 112, the ECC group number 113, and the data capacity 114 are associated with each other and are thereby managed by the logical unit information database 110.

The data migration amount information database 120 is configured by storing data migration amount information 121 for each same source logical unit number and destination logical unit number.

This data migration amount information 121 is composed of: a data migration amount 122 showing the data migration amount per hour; a data migration amount code 123 corresponding to the data migration amount 122; a data migration pace code 124 corresponding to the data migration pace at which data is migrated per hour; a read I/O count code 125 for the ECC group to which the logical unit to which data should be input belongs (hereinafter referred to as the "destination ECC group"), wherein the destination ECC group read I/O count code 125 shows a read I/O count code corresponding to the read I/O count for the destination ECC group; a read I/O count code 126 for the ECC group to which the data-outputting logical unit belongs (hereinafter referred to as the "source ECC group"), wherein the source ECC group read I/O count code 126 shows a read I/O count code corresponding to the read I/O count for the source ECC group; a source logical unit write I/O count code 127 that shows a write I/O count code corresponding to the write I/O count for a source logical unit; a source logical unit number 128; a source ECC group number 129; a source logical unit number 130; a destination ECC group 131; and a data migration amount information creation termination date and time 132 that shows the date and time when the creation of the data migration amount information 121 was terminated.

The I/O count information database 140 is configured by storing I/O count information 141 for each same date and time code for logical units provided in the storage areas in the storage devices 21 in the storage unit 20.

This I/O count information 141 is composed of: a read I/O count code 142 for the ECC group to which the relevant logical unit belongs; a logical unit read I/O count code 143; a logical unit write I/O count code 144; a logical unit number 145; an ECC group number 146; a date and time code 147 that shows a date and time code corresponding to the date and time when the creation of this I/O count information 141 was started; and an I/O count information creation termination date and time storage field 148 that stores the date and time when the creation of the I/O count information 141 was terminated.

The data migration start date and time information database 150 is configured by storing data migration start date and time information 151. This data migration start date and time information 151 is composed of: a processing number 152; a source logical unit number 153; a destination logical unit number 154; time-period-based estimated data migration amount information 155 that shows an estimated data migration amount for each time period; an update time period code 156 showing a time period code for data migration pace update; an estimated data migration amount 157 showing the estimated data migration amount during a specified length of time from the data migration start date and time to the end of the update time period; an actual data migration amount 158 showing a data migration amount that is the amount of data actually migrated during the above specified length of time from the data migration start date and time to the end of the update time period; and a data migration start date and time code 159 that shows a data migration start date and time code corresponding to the date and time to start the data migration.

The time-period-based estimated data migration amount information 155 includes: a time period code 160 that shows time period codes 1 to 24 corresponding to specified time periods 1 to 24; an estimated data migration amount 161 showing the estimated data migration amount for the relevant time period; a read I/0 count code 162; and a write I/O count code 163.

Figure 11:
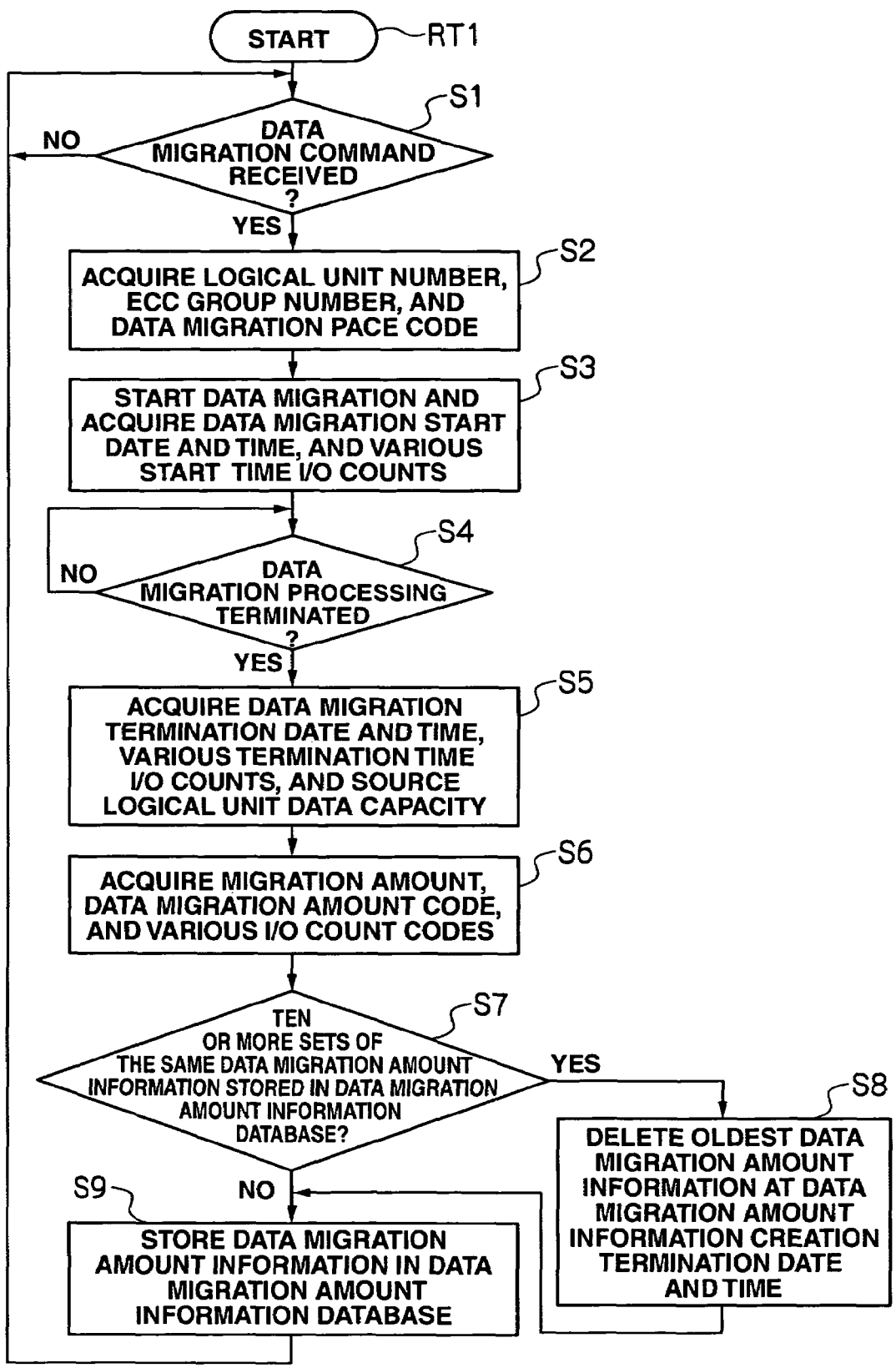
FIG. 11 is a flowchart illustrating a processing sequence for data migration amount information database creation.

(2) Data Migration Amount Information Database Creation Processing According to this Embodiment Next, data migration amount information database creation processing in the storage system 1 will be described. FIG. 11 is a flowchart illustrating a specific sequence of data migration amount information database creation control processing for controlling the creation of the data migration amount information database 120.

Figure 12:
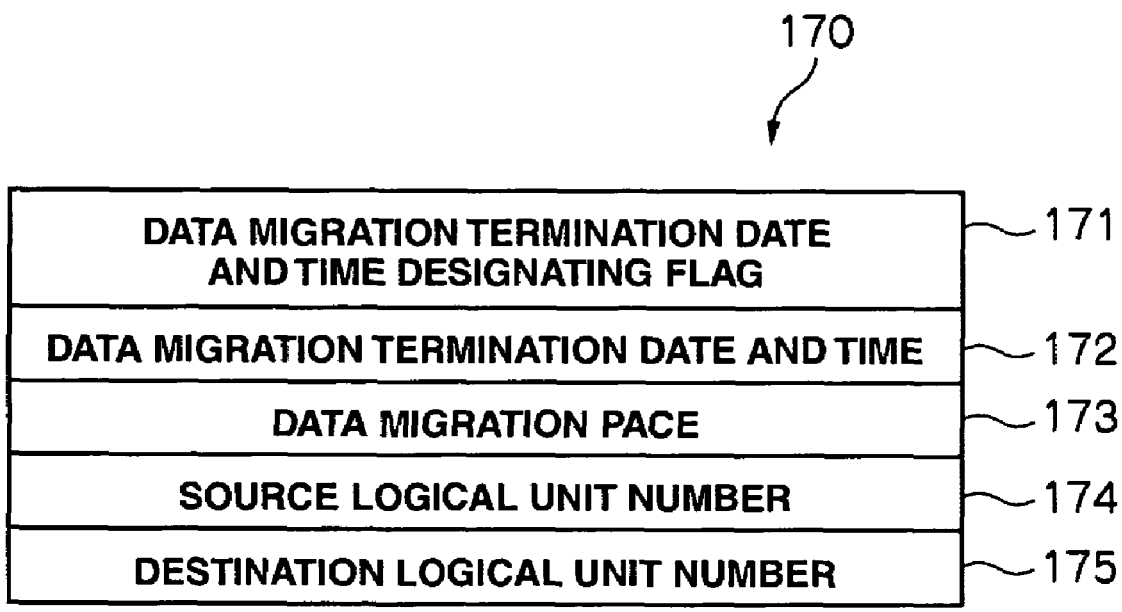
FIG. 12 is a conceptual diagram explaining a data migration command.

At the beginning, in accordance with the data migration amount database creation processing sequence RT1 as shown in FIG. 11 (S1), the channel adapter 11 waits in standby mode to receive a data migration command 170 as shown in FIG. 12 from the host system 2.

As shown in FIG. 12, this data migration command 170 is composed of: a data migration termination date and time designating flag 171; a data migration termination date and time 172; a data migration pace 173; a source logical unit number 174; and a destination logical unit number 175.

If the data migration termination date and time designating flag 171 is set to "on," the channel adapter 11 starts data migration so that the data migration will be terminated at the data migration termination date and time described later. On the other hand, if the data migration termination date and time designating flag 171 is set to "off," the channel adapter 11 starts the data migration after receiving a data migration command.

In the data migration amount database creation processing sequence RT1, the data migration termination date and time designating flag 171 is set to "off," and the channel adapter 11 is thereby designed to start the data migration when it receives a data migration command 170.

Having received a data migration command 170 from the host system 2 (S1: YES), the channel adapter 11 acquires the data migration pace 173, the source logical unit number 174, and the destination logical unit number 175 as the source logical unit number 128 and the destination logical unit number 130 for the data migration amount information 121. From the logical unit information database 110, the channel adapter 11 also acquires the source ECC group number 129 and the destination ECC group number 131 corresponding to the source logical unit number 128 and the destination logical unit number 130. Also, based on the data migration pace table 60, the channel adapter 11 acquires the data migration pace code 124 corresponding to the data migration pace 173 (S2).

Subsequently, the channel adapter 11 starts the processing for data migration from the source logical unit to the destination logical unit and acquires, according to the internal timer 50, the data migration start date and time when the data migration was started. Also, based on the read I/O counter 51, the channel adapter 11 acquires the destination ECC group read I/O count and the source logical unit read I/O count as of the start time. Moreover, based on the write I/O counter 52, the channel adapter 11 acquires the source logical unit write I/O count as of the start time (S3).

The channel adapter 11 then waits in standby mode until the data migration processing terminates (S4). When the data migration processing has terminated (S4: YES), the channel adapter 11 acquires the data migration termination date and time from the internal timer 50. Also, the channel adapter 11 acquires the destination ECC group read I/O count and the source logical unit read I/O count as of the termination time from the read I/O counter 51. The channel adapter 11 also acquires the source logical unit write I/O count as of the termination time from the write I/O counter 52 and the data capacity 114 of the source logical unit from the logical unit information database 110 (S5).

Subsequently, the channel adapter 11 calculates the data migration amount per hour based on the data migration start date and time, the data migration termination date and time, and the source logical unit data capacity 114. Specifically speaking, the following mathematical formula is used where "Ts" represents the data migration start date and time, "Te" represents the data migration termination date and time, "Ds" represents the data capacity 114 of the source logical unit, and "Dm" represents the data migration amount per hour.

[Mathematical Formula 1]

$$Dm = \frac{Ds}{Te - Ts} \quad (1)$$

The channel adapter 11 calculates the data migration amount per hour using the above-described mathematical formula, thereby acquiring the data migration amount per hour as the data migration amount code 122 for the data migration amount information 121. At the same time, the channel adapter 11 acquires, from the data migration amount code storage table 80, the hourly data migration amount code corresponding to the data migration amount per hour as the data migration code 123 for the data migration amount information 121.

The channel adapter 11 also calculates the source ECC group read I/O count per hour based on the data migration start date and time, the data migration termination date and time, the start time source ECC group read I/O count, and the termination time source ECC group read I/O count.

Specifically speaking, the following mathematical formula is used where "Ts" represents the data migration start date and time, "Te" represents the data migration termination date and time, "Cs" represents the start time destination ECC group read I/O count, "Ce" represents the termination time destination ECC group read I/O count, and "Cm" represents the destination ECC group I/O count per hour.

[Mathematical Formula 2]

$$Cm = \frac{Ce - Cs}{Te - Ts} \quad (2)$$

The channel adapter 11 calculates the destination ECC group I/O count per hour and acquires, from the I/O count table 70, the destination ECC group read I/O count code per hour corresponding to the destination ECC group read I/0 count per hour, as the destination ECC group read I/O count code 125 for the data migration amount information 121.

Moreover, by executing processing similar to that described above based on the data migration start date and time, the data migration termination date and time, the start time source logical unit read I/O count, and the termination time source logical unit read I/O count, the channel adapter 11 calculates the source logical unit read I/O count per hour and acquires, from the I/O count table 70, the source logical unit read I/O count code per hour corresponding to the source logical unit read I/O count per hour as the source logical unit read I/O count code 126 for the data migration amount information 121.

Furthermore, by executing processing similar to that described above based on the data migration start date and time, the data migration termination date and time, the start time source logical unit write I/O count, and the termination time source logical unit write I/O count, the channel adapter 11 calculates the source logical unit write I/O count per hour and acquires, from the I/0 count table 70, the source logical unit write I/O count code per hour corresponding to the source logical unit write I/O count per hour as the source logical unit write I/O count code 127 for the data migration amount information 121 (S6). Then, the channel adapter 11 acquires the data migration amount information creation termination date and time according to the internal timer 50, thereby terminating the creation of the data migration amount information 121.

Subsequently, the channel adapter 11 checks whether or not 10 or more sets of the data migration amount information 121, including the same data migration pace code 124, the same source logical unit number 128, and the same destination logical unit number 130, are stored in the data migration amount information database 120 (S7). If 10 or more sets of the data migration amount information 121 are stored in the data migration amount information database 120 (S7: YES), the channel adapter 11 deletes the data migration amount information 121 with the oldest data migration amount information creation termination date and time 132 from among the 10 or more sets of the data migration amount information 121 including the same data migration pace code 124, the same source logical unit number 128, and the same destination logical unit number 130, in the data migration amount information database 120 (S8). On the other hand, if 10 or more sets of the data migration amount information 121 are not stored in the data migration amount information database 120 (S7: NO), the channel adapter 11 stores the data migration amount information 121 in the data migration amount information database 120 (S9).

Then, the channel adapter 11 returns to standby mode to wait for another data migration command 170 from the host system 2 (S1) and repeats the same processing sequence thereafter (from S1 to S9 and then back to S1).

As described above, the storage system 1 is configured in such a way that the data migration amount information 121 is created to set the data migration amount per hour 122, and the data migration amount information 121 associated respectively with the source logical unit 128, the destination logical unit 130, and the migration pace code 124 can be stored in the data migration amount information database 120.

Figure 13:
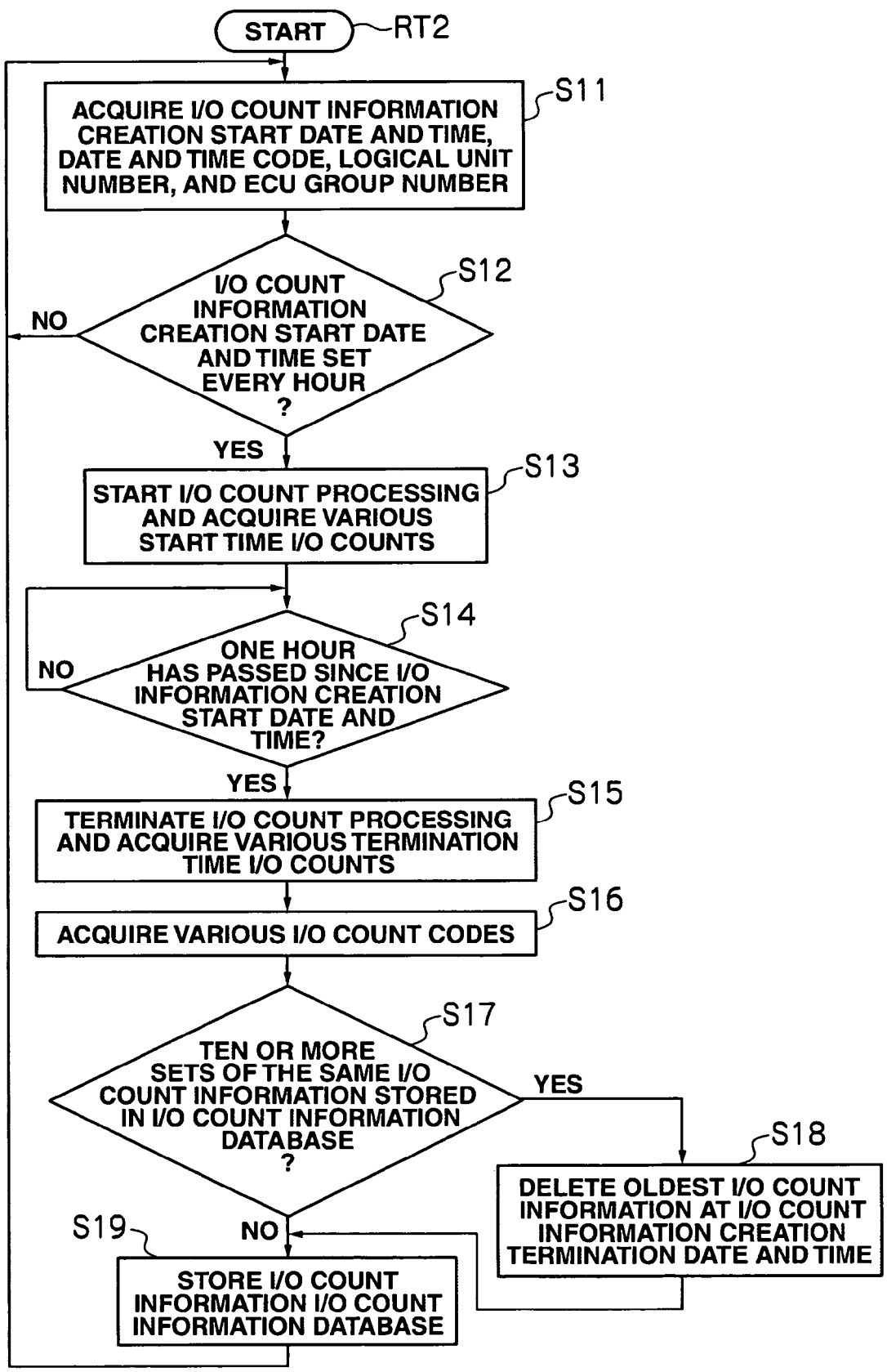
FIG. 13 is a flowchart explaining a processing sequence for I/O count information database creation.

(3) I/O Count Information Database Creation Processing According to this Embodiment Next, I/O count information database creation processing in the storage system 1 will be described below. FIG. 13 is a flowchart illustrating a specific sequence of I/O count information database creation control processing for controlling the creation of the I/0 count information database 140.

At the beginning, in accordance with the I/O count information database creation processing sequence RT2 as shown in FIG. 13, the disk adapter 12 starts this I/O count information database creation processing sequence RT2 every hour and acquires an I/0 count information creation start date and time based on the internal timer 50, and then acquires, from the date and time code table 90, the date and time code corresponding to the I/0 count information creation start date and time, as the date and time code 147 of the I/O count information database 141. The disk adapter 12 also acquires the logical unit number of all target logical units as the logical unit number 145 of the I/O count information 141. Moreover, the disk adapter 12 acquires the ECC group number corresponding to the logical unit number 145 from the logical unit information database 110 as the ECC group number 146 of the I/O count information database 141 (Sll).

Subsequently, the disk adapter 12 checks whether or not the I/O count information creation start date and time is set at one hour intervals (S12). If the I/O count information creation start date and time is not set at one hour intervals (S12: NO), the disk adapter 12 reacquires the I/O information creation start date and time from the internal timer 50 (S11). On the other hand, if the I/O count information creation start date and time is set at one hour intervals (S12: YES), the disk adapter 12 starts the I/O count processing for all target logical units and acquires, from the read I/O counter 51, the read I/O count of the ECC group, to which the logical units belong, and the logical unit read I/O count as of the start time. The disk adapter 12 also acquires the logical unit write I/O count as of the start time from the write I/O counter 52 (S13).

Then, the disk adapter 12 waits in standby mode for an hour to elapse from the I/O count information creation start date and time (S14). When an hour has elapsed from the I/O count information creation start date and time (S14: YES), the disk adapter 12 terminates the I/O count processing for all target logical units and acquires, from the internal timer 50, the I/O count termination date and time when the I/O count processing is terminated. The disk adapter also acquires, from the read I/O counter 51, the read I/O count of the ECC group, to which the logical units belong, and the logical unit read I/O count as of the termination time. Moreover, the disk adapter 12 acquires the logical unit write I/O count as of the termination time from the write I/O counter 52 (S15).

Subsequently, the disk adapter 12 calculates the ECC group read I/O count per hour based on the start time ECC group read I/O count and the termination time ECC group I/O count.

Specifically speaking, the following mathematical formula is used where "$Cs_2$" represents the ECC group read I/O count as of the start time, "$Ce_2$" represents the ECC group read I/O count as of the termination time, and "$Cm_2$" represents the ECC group read I/O count per hour:

[Mathematical Formula 3]

$$Cm_2 = Ce_2 - Cs_2 \qquad (3)$$

The disk adapter 12 calculates the ECC group read I/O count per hour using the above-described mathematical formula and then acquires, from the I/O count table 70, the ECC group hourly read I/O count code corresponding to the ECC group read I/O count per hour, as the ECC group read I/O count code 142 of the I/O count information 141.

By executing processing similar to that described above based on the logical unit read I/O count as of the start time and the logical unit read I/O count as of the termination time, the disk adapter 12 calculates the logical unit read I/O count per hour and then acquires, from the I/O count table 70, the logical unit hourly read I/O count code corresponding to the logical unit read I/O count per hour, as the logical unit read I/O count code 143 of the I/O count information 141.

Furthermore, by executing processing similar to that described above based on the logical unit write I/O count as of the start time and the logical unit write I/O count as of the termination time, the disk adapter 12 calculates the logical unit write I/O count per hour and then acquires, from the I/O count table 70, the logical unit hourly write I/O count code corresponding to the logical unit write I/O count per hour, as the logical unit write I/O count code 144 of the I/O count information 141 (S16). Then, the disk adapter 12 acquires the I/O count information creation termination date and time 148 from the internal timer 50, and terminates the creation of the I/O count information 141. Next, the disk adapter 12 checks whether or not ten or more sets of the I/O count information 141 of the same logical unit number 145 and time and date code 147 are stored in the I/O count information database 140 (S17).

If ten or more sets of the I/O count information 141 are stored in the I/O count information database 140 (S17: YES), the disk adapter 12 deletes the I/O count information 141 having the oldest I/O count information creation termination date and time from the I/O count information 141 of the same logical unit number 145 and date and time code 147 in the I/O count information database 140 (S18).

On the other hand, if ten or more sets of the I/O count information 141 are not stored in the I/O count information database 140 (S17: NO), the disk adapter 12 stores that I/O count information 141 in the I/O count information database 140 (S19).

The disk adapter 12 then returns to standby mode to wait for the I/O counter start time and date according to the internal timer 50 (S11), and repeats the same processing sequence thereafter (from S11 to S19 and back to S11).

Like this, the storage system 1 is configured in such a way that the I/O count information 141 is created to set the ECC group hourly read I/O count code 142, the logical unit hourly read I/O count code 143, and the logical unit hourly write I/O count code 144, and the I/O count information 141 for each logical unit number 145 of all target logical units can be stored in the I/O count information database 140.

Figure 14:
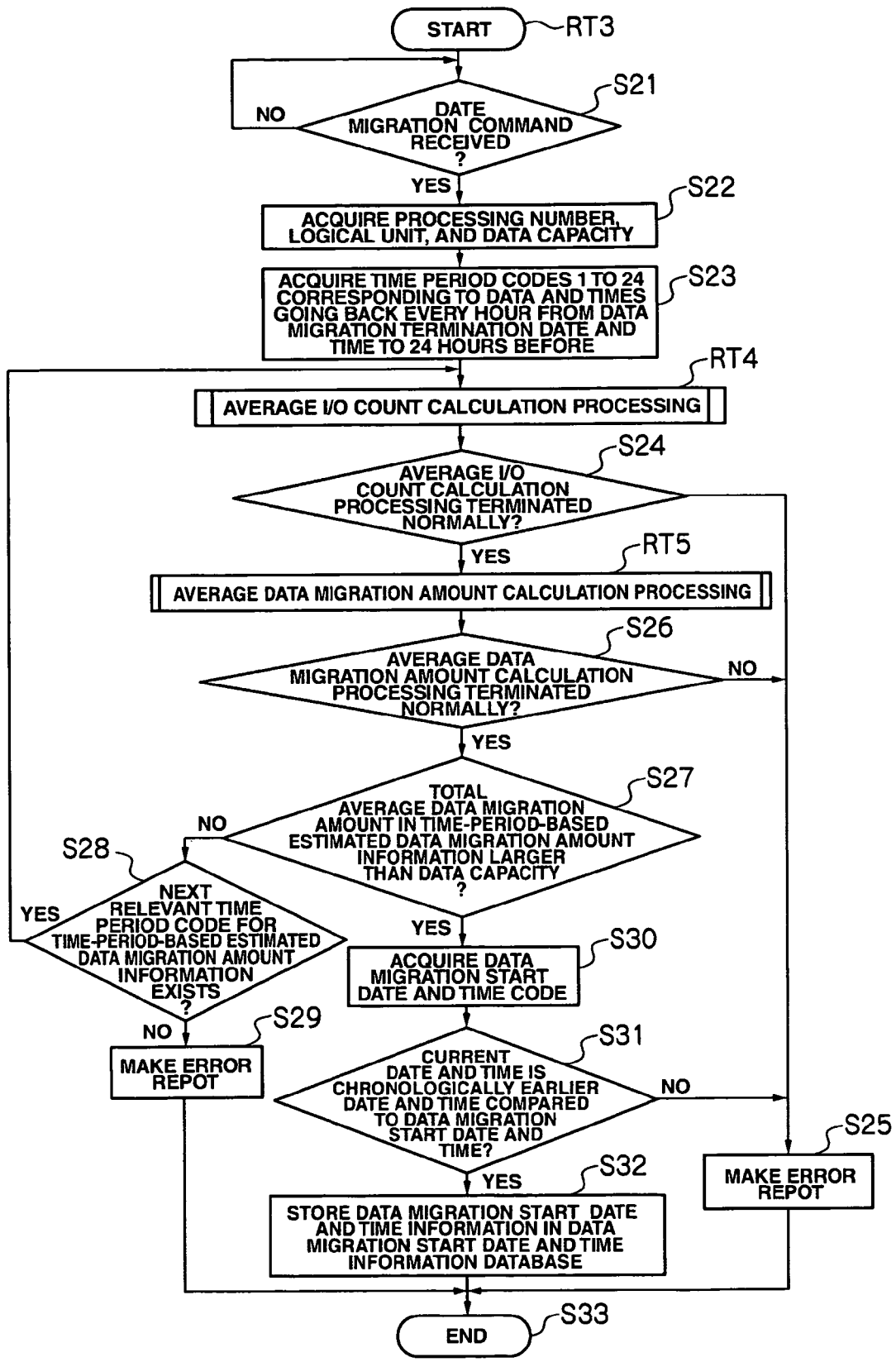
FIG. 14 is a flowchart explaining a processing sequence for data migration start date and time information database creation.

(4) Data Migration Start Date and Time Information Database Creation Processing According to this Embodiment Next, data migration start date and time information database creation processing in the storage system 1 will be described. FIG. 14 is a flowchart explaining a specific sequence for the data migration start date and time information database creation control processing of controlling the creation of the data migration start date and time information database 150.

At the beginning, in accordance with the data migration start date and time information database creation processing sequence RT3 shown in FIG. 14, the channel adapter 11 waits in standby mode to receive the data migration command 170 shown in FIG. 12 from the host system 2 (S21).

In the data migration start date and time information database creation processing sequence RT3, the data migration termination date and time designating flag 171 is set to "on" and the data migration termination date and time 172 is set.

When the channel adapter 11 receives the data migration command 170 from the host system 2 (S21: YES), it acquires the processing number 152 and also acquires the source logical unit number 174 and destination logical unit number 175 of the data migration command 170 as the source logical unit number 153 and destination logical unit number 154 of the data migration start date and time information 151. The channel adapter 11 also acquires the source logical unit data capacity 114 from the logical unit information database 110 (S22).

Subsequently, the channel adapter 11 acquires, from the date and time code table 90, the date and time codes corresponding to the dates and times over a 24-hour period in one-hour increments going back from the data migration termination date and time 172 of the data migration command 170, as the time period codes 160 (from time period code 1 to time period code 24) of the time-period-based estimated data migration amount information 155 of the data migration start date and time information 151.

When the channel adapter 11 acquires the time period codes 160 for the time-period-based estimated data migration amount information 155 of the data migration start date and time information 151, it executes average I/O count calculation processing of calculating an hourly average read I/O count code and hourly average write I/O count code for each time period code 160.

Figure 15:
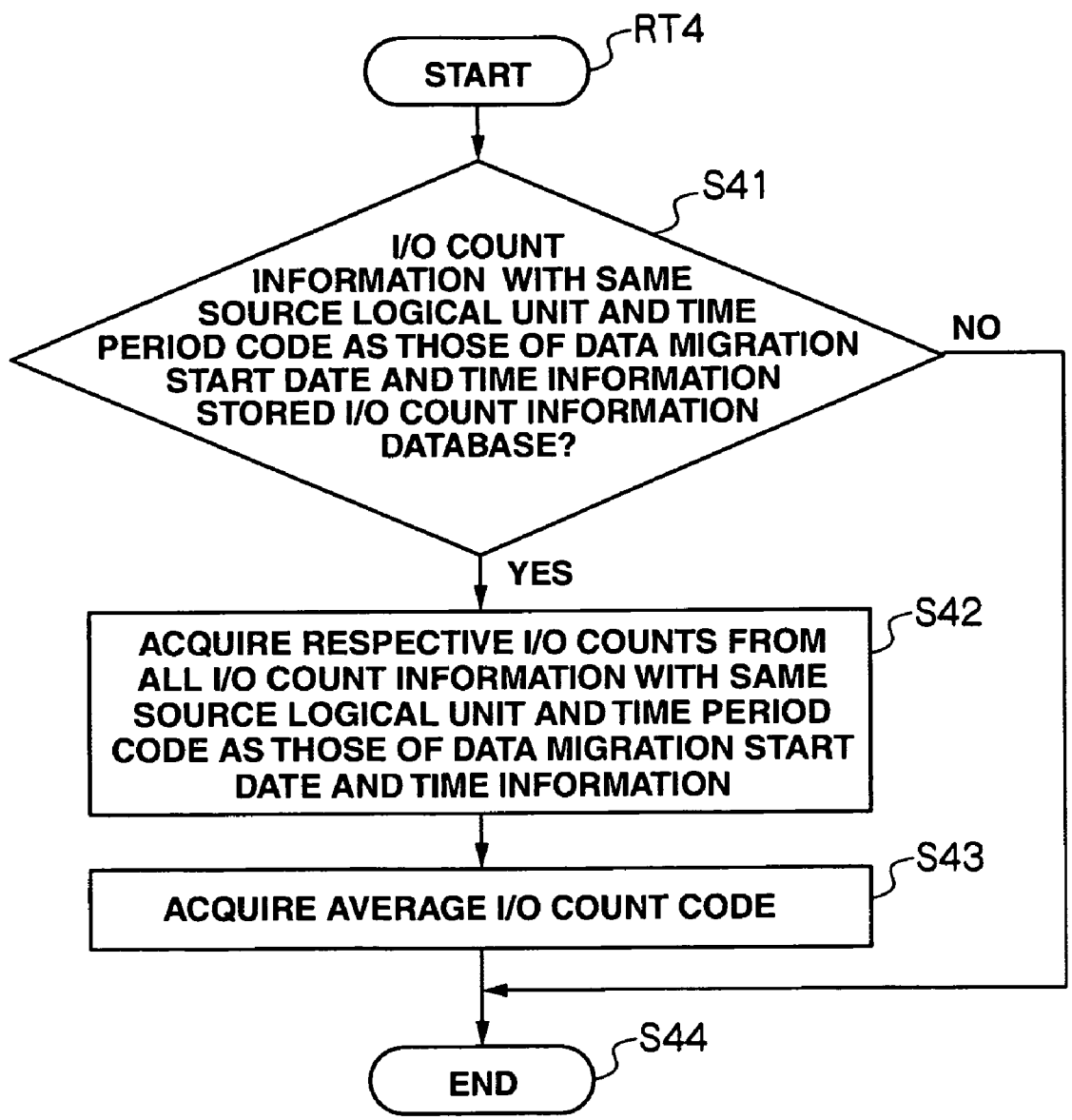
FIG. 15 is a flowchart explaining an average I/O count calculation processing sequence.

FIG. 15 is a flowchart illustrating a specific processing sequence for the average I/O count calculation to control the calculation of the hourly average read I/O count code and hourly average write I/O count code for each time period code 160.

At the beginning, in accordance with the average I/O count calculation processing sequence RT4 shown in FIG. 15, the channel adapter 11 checks whether any I/O count information 141 having the same source logical unit number 145 and date and time code 147 as the source logical unit number 153 and time period code 160 of the data migration start date and time information 151 is stored in the I/O count information database 140 (S41).

If no I/O count information 141 having the same source logical unit number 145 and date and time code 147 as the source logical unit number 153 and time period code 160 is stored in the I/O count information database 140 (S41: NO), the channel adapter 11 judges that an error has occurred, and terminates this average I/O count calculation processing sequence RT4 (S45).

On the other hand, if the I/O count information 141 having the same source logical unit number 145 and date and time code 147 as the source logical unit number 153 and time period code 160 is stored in the I/O count information database 140 (S41: YES), the channel adapter 11 acquires the logical unit read I/O count 143 and write I/O count 144 from all I/O count information 141 having the same source logical unit number 145 and date and time code 147 as the source logical unit number 153 and time period code 160 of the data migration start date and time information 151 (S43).

Next, the channel adapter 11 calculates the average read I/O count per hour according to the read I/O count 143 of the respective logical units of all I/O count information 141.

Specifically speaking, the following mathematical formula is used where "i(k)" represents the read I/O count 143 of each logical unit for the I/O count information 141, and "im" represents the average read I/O count:

[Mathematical Formula 4]

$$im = \frac{\sum_{k=1}^{n} i(k)}{n} \quad (1 \leq n \leq 10) \quad (4)$$

The channel adapter 11 calculates the average read I/O count per hour using the above mathematical formula and then acquires, from the I/O count table 70, the average read I/O count code corresponding to the average read I/O count per hour as the average read I/O count code 162 for the time-period-based estimated data migration amount information 155 of the corresponding data migration start date and time information 151.

Furthermore, by executing processing similar to that described above based on the write I/O count 144 of each logical unit of all I/O count information 141, the channel adapter 11 calculates the average write I/O count per hour and then acquires, from the I/O count table 70, the average write I/O count code corresponding to the average write I/O count per hour, as the average write I/O count code 163 for the time-period-based estimated data migration amount information 155 of the corresponding data migration start date and time information 151 (S43).

When the average I/O count calculation processing sequence RT4 is terminated (S44), the channel adapter 11 checks whether or not the I/O count calculation processing sequence terminated normally (S24).

If the average I/O count calculation processing did not terminate normally (S24: NO.), the channel adapter 11 judges that an error occurred, sends an error report to the host system 2 (S25), and then terminates this data migration start date and time information database creation processing sequence RT3 (S33).

On the other hand, if the average read I/O count and average write I/O count calculation processing sequence terminated normally (S24: YES), the channel adapter 11 executes average data migration amount calculation processing of calculating the average data migration amount per hour for each time period code.

Figure 16:
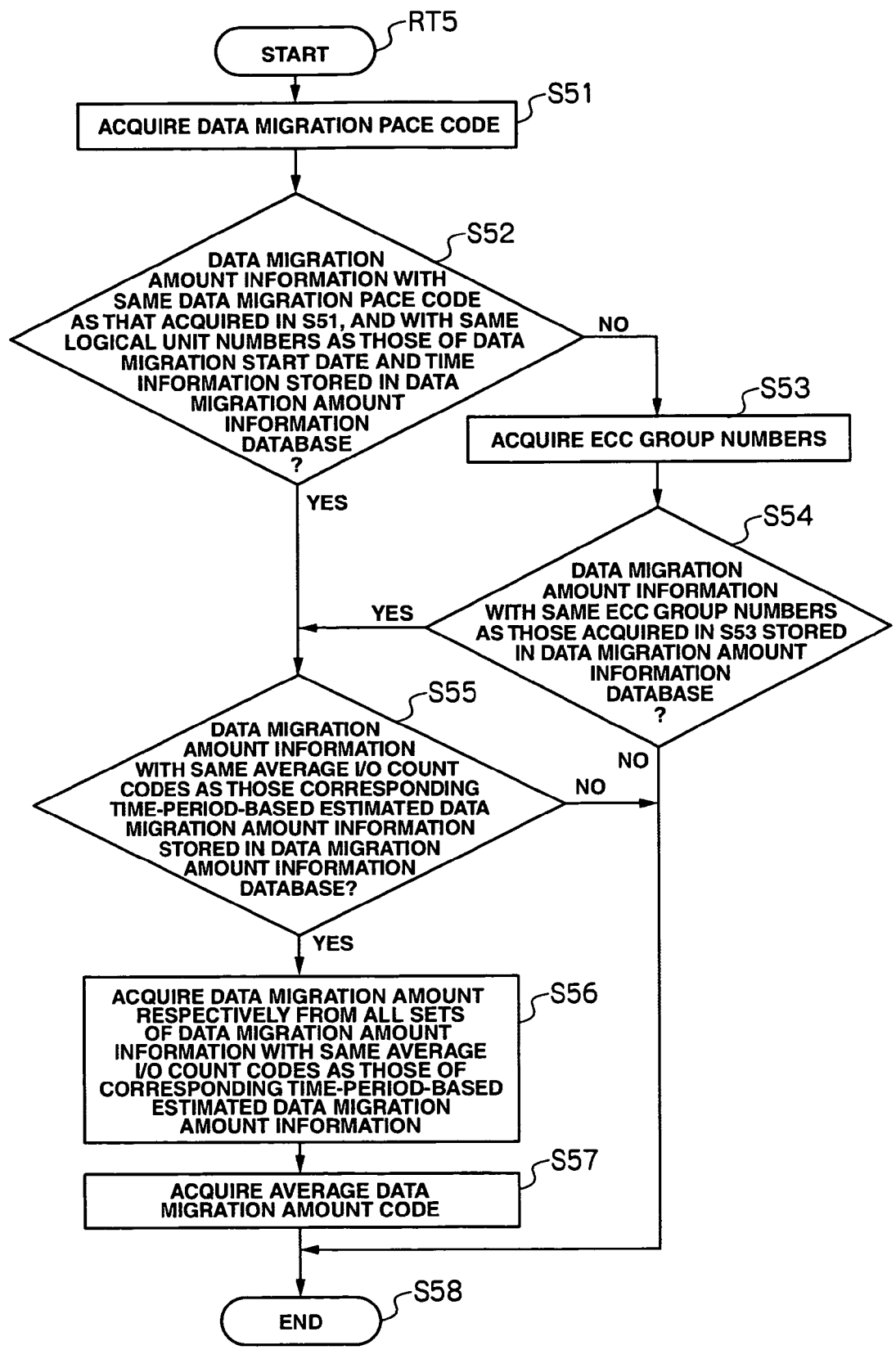
FIG. 16 is a flowchart explaining an average data migration amount calculation processing sequence.

FIG. 16 is a flowchart illustrating a specific sequence of average data migration amount calculation processing for controlling the calculation of the average data migration amount code per hour for each time period code 160.

At the beginning, in accordance with the average data migration amount calculation processing sequence RT5 shown in FIG. 16, the channel adapter 11 acquires the data migration pace code corresponding to the data migration pace 173 of the data migration command 170 (S51).

The channel adapter 11 then checks whether or not any data migration amount information 121 having the same data migration pace code 124, source logical unit number 128, and destination logical unit number 130 as the above-obtained data migration pace code 124 and the source logical unit number 153 and destination logical unit number 154 for the data migration start date and time information 151 is stored in the data migration amount information database 120 (S52).

If no data migration amount information 121 having the same data migration pace code 124, source logical unit number 128, and destination logical unit number 130 as the above-obtained data migration pace code and the source logical unit number 153 and destination logical unit number 154 for the data migration start date and time information 151 is stored in the data migration information database 120 (S52: NO), the channel adapter 11 acquires, from the logical unit information database 110, the source ECC group number and the destination ECC group number corresponding to the source logical unit number 153 and the destination logical unit number 154 (S53).

Next, the channel adapter 11 checks whether or not any data migration amount information 121 having the same source ECC group number 128 and destination ECC group number 130 as the above-obtained source ECC group number and destination ECC group number is stored in the data migration amount information database 120 (S54).

If no data migration amount information 121 having the same source ECC group number 128 and destination ECC group number 130 as the above-obtained source ECC group number and destination ECC group number is stored in the data migration amount information database 120 (S54: NO), the channel adapter 11 judges that an error has occurred, and terminates this average data migration amount calculation processing sequence RT5 (S58). On the other hand, if the data migration amount information 121 having the same source ECC group number 128 and destination ECC group number 130 as the above-obtained source ECC group number and destination ECC group number is stored in the data migration amount information database 120 (S54: YES), the channel adapter 11 then checks whether or not any data migration amount information 121 having the same read I/O count code and write I/O count code as the average read I/O count code 162 and average write I/O count code 163 for the corresponding time-period-based estimated data migration amount information 155 is stored in the data migration amount information database 120 (S55).

At the same time, if the data migration amount information 121 having the same data migration pace code 124, source logical unit number 128, and destination logical unit number 130 as the above-obtained data migration pace code and the source logical unit number 153 and destination logical unit number 154 for the data migration start date and time information 151 is stored in the data migration amount information database 120 (S52: YES), the channel adapter 11 checks whether or not any data migration amount information 121 having the same read I/O count code and write I/O count code as the average read I/O count code 162 and average write I/O count code 163 for the corresponding time-period-based estimated data migration amount information 155 is stored in the data migration amount information database 120 (S55).

If no data migration amount information 121 having the same read I/O count code and write I/O count code as the average read I/O count code 162 and average write I/O count code-163 for the corresponding time-period-based estimated data migration amount information 155 is stored in the data migration amount information database 120 (S55: NO), the channel adapter 11 judges that an error has occurred, and terminates this average data migration amount calculation processing sequence RT5 (S58).

On the other hand, if the data migration amount information 121 having the same read I/O count code and write I/O count code as the average read I/O count code 162 and average write I/O count code 163 for the corresponding time-period-based estimated data migration amount information 155 is stored in the data migration amount information database 120 (S55: YES), the channel adapter 11 acquires the data migration amounts 122 from all data migration amount information 121 having the same read I/O count code and write I/O count code as the average read I/O count code 162 and average write I/O count code 163 for the corresponding time-period-based estimated data migration amount information 155 (S56).

Next, the channel adapter 11 calculates the average data migration amount per hour based on the respective data migration amounts 122 of all data migration amount information 121.

Specifically speaking, the following mathematical formula is used where "d(k)" represents the respective data migration amounts 122 of the data migration amount information 121, and "dm" represents the average data migration amount per hour:

[Mathematical Formula 5]

$$dm = \frac{\sum_{k=1}^{n} d(k)}{n} \quad (1 \leq n \leq 10) \quad (5)$$

The channel adapter 11 calculates the average data migration amount per hour using the above mathematical formula and then acquires, from the data migration pace table 60, the average data migration amount code corresponding to the average data migration amount per hour, as the average data migration amount code 161 of the time-period-based estimated data migration amount information 155 of the corresponding data migration start date and time information 151 (S57).

Subsequently, when the average data migration amount calculation processing sequence RT5 is terminated (S58), the channel adapter 11 checks whether or not the average data migration amount calculation processing terminated normally (S26). If the average data migration amount calculation processing did not terminate normally (S26: NO), the channel adapter 11 judges that an error occurred, sends an error report to the host system 2 (S25), and then terminates this data migration start date and time information database creation processing sequence RT3 (S33).

On the other hand, if the average data migration amount calculation processing sequence terminated normally (S26: YES), the channel adapter 11 checks whether the total average data migration mount 161 of the respective time-period-based estimated data migration amount information 155 as measured from the data migration termination date and time has become larger than the data capacity 114 of the source logical unit (S27). If the total average data migration amount 161 is not larger than the data capacity 114 of the source logical unit (S27: NO), the channel adapter 11 checks whether or not any next relevant time period code 160 of the time-period-based estimated data migration amount information 155 exists (S28).

If the next relevant time period code 160 of the time-period-based estimated data migration amount information 155 does not exist (S28: NO), that is, if all time period codes 160 (up to time period code 24) in the time-period-based estimated data migration amount information 155 are being used, the channel adapter 11 judges that an error has occurred, sends an error report to the host system 2 (S29), and terminates this data migration start date and time information database creation processing sequence RT3 (S33).

On the other hand, if the next relevant time period code 160 of the time-period-based estimated data migration amount information 155 exists (S28: YES), that is, if not all time period codes 160 for the time-period-based estimated data migration amount information 155 are being used up to time period 24, the channel adapter 11 executes the average I/O count calculation processing sequence RT4 of the next relevant time-period-based estimated data migration amount information 155 (RT4).

On the other hand, if the total average data migration amount 161 becomes larger than the source logical unit data capacity 114 (S27: YES), the channel adapter 11 acquires the time period code 160 at that moment as the data migration start date and time code 158 of the data migration start date and time information 151 (S30).

Subsequently, the channel adapter 11 acquires, from the date and time code table 90, the data migration start date and time corresponding to the data migration start date and time code 159, and then checks whether the current date and time recorded by the internal timer 50 is chronologically earlier date and time compared to the data migration start date and time (S31).

If the current date and time recorded by the internal timer 50 is not chronologically earlier date and time compared to the data migration start date and time (S31: NO), the channel adapter 11 judges that an error has occurred, sends an error report to the host system 2 (S25), and terminates this data migration start date and time information database creation and processing sequence RT3 (S33).

If the current date and time recorded by the internal timer 50 is chronologically earlier date and time compared to the data migration start date and time (S31: YES), the channel adapter 11 acquires, from the date and time code table 90, the date and time code one hour after the data migration start date and time code 159, as the update time period code 156, acquires the actual data migration amount 157 as "0", and terminates the creation of the data migration start date and time information 151.

The channel adapter 11 stores the data migration start date and time information 151 in the data migration start date and time information database 150 (S32) and then terminates the data migration start date and time information database creation processing sequence RT3 (S33).

As described above, the storage system 1 is configured in such a way that the data migration start date and time code 159 can be calculated based on the average data migration amount codes 161, average read I/O count codes 162 and average write I/O count codes 163 associated with the time period codes 160 assigned for a 24-hour period in one-hour increments going back from the data migration termination date and time 172 of the data migration command 170.

(5) Database Migration Pace Control Processing according to this Embodiment

Figure 17:
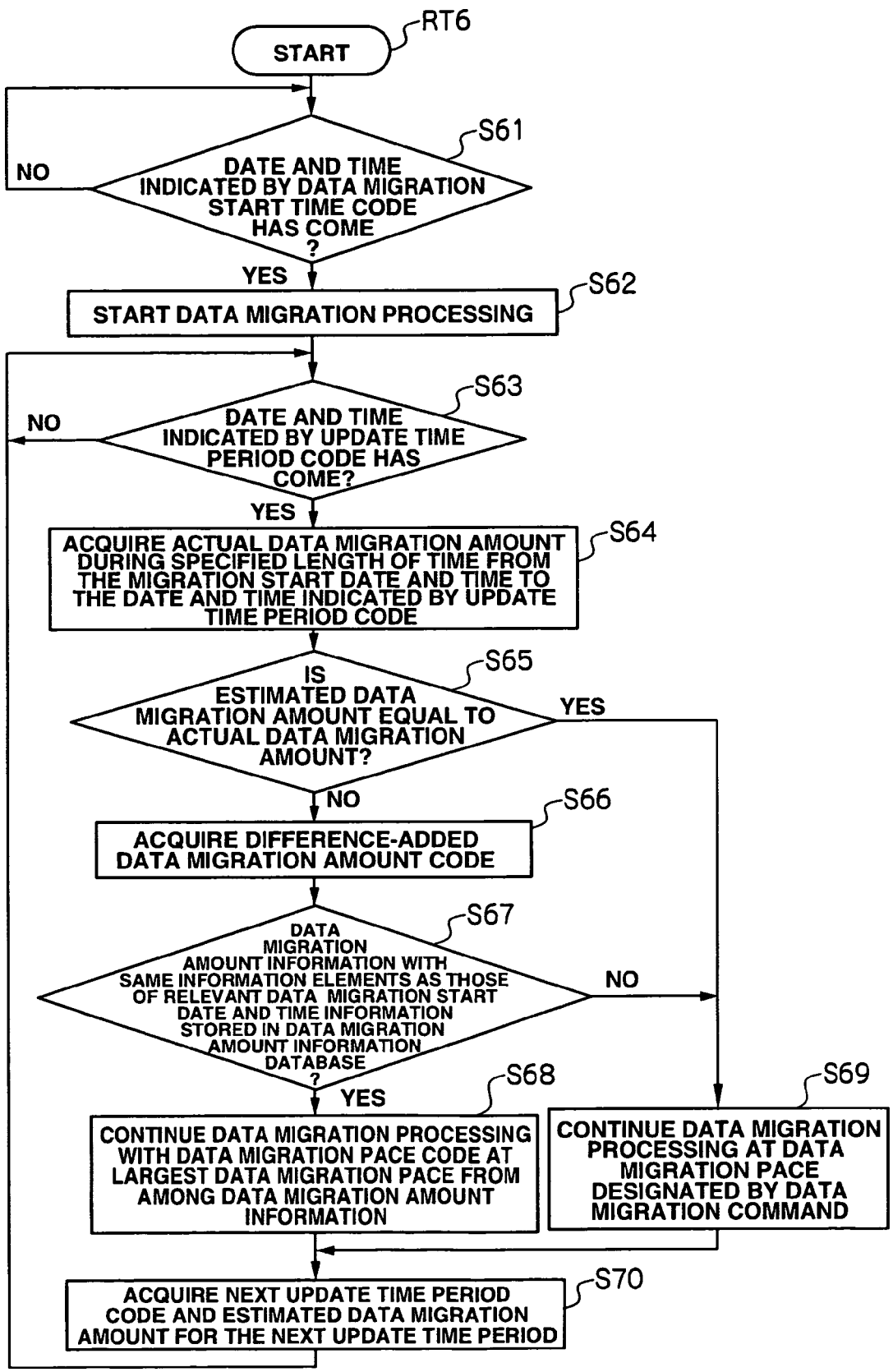
FIG. 17 is a flowchart explaining a data migration pace control processing sequence.

Next, data migration pace control processing in the storage system 1 will be described. FIG. 17 is a flowchart illustrating a specific data migration pace control processing sequence for controlling the data migration pace during data migration processing.

At the beginning, in accordance with the data migration pace control processing sequence RT6 shown in FIG. 17, the disk adapter 12 waits in standby mode until the date and time indicated by the data migration start date and time code 159 in the data migration start date and time information 151 comes (S61). When the date and time indicated by the data migration start date and time code 159 comes (SP61: YES), the disk adapter 12 starts data migration processing from the source logical unit to the destination logical unit (S62).

Then, the disk adapter 12 waits in standby mode for the date and time indicated by the update time period code 156 to come (S63). When the date and time indicated by the update time period code 156 comes (SP63: YES), the disk adapter 12 calculates the actual data migration amount during a specified length of time from the data migration start date and time to the date and time indicated by the update time period code 156 and acquires it as the actual data migration amount 158 in the data migration start date and time information 151 (S64).

Subsequently, the disk adapter 12 checks whether or not the estimated data migration amount 157 is equal to the actual data migration amount 158 (S65). If the estimated data migration amount 157 is not equal to the actual data migration amount 158 (S65: NO), the disk adapter 12 adds the difference between the estimated data migration amount 157 and the actual data migration amount 158 to that estimated data migration amount 157 and thereby acquires, from the data migration amount table 80, a difference-added data migration amount code corresponding to the above-obtained difference-added data migration amount (S66).

Next, the disk adapter 12 checks whether or not any data migration amount information 121 having the same information elements as the above-obtained difference-added data migration amount code; the source logical unit number 153 and destination logical unit number 154 in the data migration start date and time information 151; as well as the average read I/O count 162 and average write I/O count 163 in the time-period-based estimated data migration amount information 155 of the update time period code 156, is stored in the data migration amount information database 120 (S67).

If the data migration amount information 121 having the same information elements listed above is stored in the data migration amount information database 120 (S67: YES), the disk adapter 12 continues the data migration processing with the data migration pace code having the largest data migration pace among all relevant data migration amount information 121 (S68).

On the other hand, if no data migration amount information 121 having the same information elements listed above is stored in the data migration amount information database (S67: NO), or if the estimated data migration amount 157 is equal to the actual data migration amount 158 (S65: YES), the disk adapter 12 continues the data migration processing at the data migration pace 173 designated by the data migration command 170 (S69).

Subsequently, the disk adapter 12 acquires, as the update time period code 156, the next update time period code that is the date and time code indicating one hour after the latest update time period code 156. Also, the disk adapter 12 adds the estimated data amount 161 of the time-period-based estimated data migration amount information 155 having the same next update time period code to the estimated data migration amounts 157 up to the date and time indicated by the latest update time period code 156, thereby creates the estimated data migration amount for the next update time period code and acquires it as the estimated data migration amount 157 (S70).

The disk adapter 12 then returns to standby mode to wait for the date and time indicated by the update time period code 156 to come (S63) and repeats the same processing sequence thereafter (from S63 to S70 and then back to S63).

(6) Operation and Effects of this Embodiment

As described above, the storage system 1 according to this embodiment calculates the average read I/O count and the average write I/O count for each time period code 160 assigned for a 24-hour period in one-hour increments going back from the data migration termination date and time 172 of the data migration command 170, and calculates the estimated data migration amount 161 for each time period code 160 based on the above-obtained average read I/O count and average write I/O count, and calculates the data migration start date and time code 159 based on the above-obtained estimated data migration amount 161.

Accordingly, in this storage system 1, a user does not have to set the data migration start date and time by guessing the data migration termination date and time. Instead, the user only has to designate the data migration termination date and time so that the data migration start date and time can be set to enable the termination of data migration at that designated data migration termination date and time. Moreover, since in this storage system 1 the data migration start date and time is set so as to enable the termination of data migration at the designated data migration termination date and time, it is possible to use the storage devices efficiently without the need to prepare spare storage devices.

The storage system 1 according to this embodiment is designed to acquire, as the data migration start date and time code 159 of the data migration start date and time information 151, the time period code indicating the date and time when the total average data migration amount 161 as measured from the data migration termination date and time becomes larger than the source logical unit data capacity 114.

Moreover, when the date and time indicated by the data migration start date and time code 159 comes, the storage system 1 according to this embodiment starts migrating data from the source logical unit to the destination logical unit at the data migration pace 173 indicated in the data migration command 170. When the date and time indicated by the update time period code 156 comes, the storage system 1 checks whether or not the estimated data migration amount 157 is equal to the actual data migration amount 158. If the estimated data migration amount is not equal to the actual data migration amount 158, the designated data migration pace code is changed to the data migration pace code, among those included in the relevant data migration amount information 121, that will realize the data migration at the largest data migration pace, based on the difference-added data migration amount.

Accordingly, even when there is a possibility that the data migration might be terminated earlier or later than the scheduled migration termination date and time due to some factors such as transfer speeds during the data migration, the data migration pace can be changed so as to enable the termination of data migration at the designated data termination date and time.

Furthermore, the storage system 1 according to this embodiment is designed to use expensive disk drives as the storage devices 21, and inexpensive disk drives as the storage devices 41. Therefore, since the data migration start date and time is set to enable the termination of data migration at the designated data termination date and time, it is unnecessary to prepare expensive spare storage devices, and the storage system 1 can adapt to the data cycle management (DCLM) and use the expensive storage devices more efficiently.

This embodiment describes the case where the processing sequences are executed by hardware having functions for the relevant processing. However, this invention is not limited thereto, and the processing sequences may be executed by software. When software is used to perform the processing, various kinds of programs need to be installed on a computer in which the program constituting the software to perform the processing is incorporated into special-purpose hardware, thereby enabling the execution of various functions. The various kinds of programs can be installed from, for example, recording media. Examples of recording media obviously include optical disks, magneto-optical disks, semiconductor memory, and magnetic disks. Various programs may also be installed by downloading them via a network such as the Internet.

The present invention can be applied not only to the storage system for migrating data between a plurality of disk array apparatuses, but also to various kinds of equipment relating to data migration.

What is claimed is:

1. A disk array apparatus having a source volume that is a source for data migration, and the disk array apparatus migrating the data to a destination volume that is a destination for the data migration, the disk array apparatus comprising:
   an access frequency calculator for calculating a separate access frequency of access to the source volume for each of a plurality of time periods, respectively, extending backwards in time from a data migration termination date and time when the data migration termination date and time is designated externally, each time period of the plurality of time periods being of a predetermined length of time;
   an estimated data migration amount calculator for calculating a separate estimated data migration amount for each respective time period of the plurality of time periods, based on the separate access frequency calculated for the respective time period by the access frequency calculator; and
   a data migration start date and time calculator for calculating a data migration start date and time based on a collection of estimated data migration amounts for the plurality of time periods, as calculated by the estimated data migration amount calculator.

2. The disk array apparatus according to claim 1, wherein the data migration start date and time calculator calculates, as the data migration start date and time, a starting time for a time period when a total estimated data migration amount as measured from the data migration termination date and time becomes larger than a capacity of the source volume.

3. The disk array apparatus according to claim 1, comprising a data migrating unit for migrating the data from the source volume to the destination volume when the data migration start date and time as calculated by the data migration start date and time calculator occurs,
   wherein the data migrating unit migrates the data from the source volume to the destination volume at a data migration pace if the data migration pace is designated externally; and the data migrating unit compares a total estimated migration amount during a specified length of time from the data migration start date and time to an end of a specified time period, with an actual data migration amount during that specified length of time, and changes the data migration pace according to a difference between the total estimated data migration amount and the actual data migration amount during the specified length of time.

4. The disk array apparatus according to claim 3, wherein when the total estimated data migration amount during the specified length of time is equal to the actual data migration amount during the specified length of time, the data migrating unit migrates data from the source volume to the destination volume while keeping the externally designated data migration pace.

5. The disk array apparatus according to claim 1, wherein the source volume is stored in an expensive hard disk drive, while the destination volume is stored in an inexpensive hard disk drive.

6. A data migration method carried out by a disk array apparatus having a source volume that is a source for data migration, and the disk array apparatus migrating the data to a destination volume that is a destination for the data migration,
   the data migration method comprising:
   a first step of calculating a separate access frequency of access to the source volume for each of a plurality of time periods, respectively, extending backwards in time from a data migration termination date and time when the data migration termination date and time is designated externally, each time period of the plurality of time periods being of a predetermined length of time;
   a second step of calculating a separate estimated data migration amount for each respective time period of the plurality of time periods, based on the separate access frequency calculated for the respective time period in the first step; and
   a third step of calculating a migration start date and time based on a collection of estimated data migration amounts for the plurality of time periods, as calculated in the second step.

7. The data migration method according to claim 6, wherein in the third step, a starting time for a time period when a total estimated data migration amount, as measured from the data migration termination date and time, becomes larger than a capacity of the source volume, is calculated as the data migration start date and time.

8. The data migration method according to claim 6, comprising a fourth step of migrating the data from the source volume to the destination volume when the data migration start date and time calculated in the third step occurs, wherein in the fourth step, if a data migration pace is designated externally, the data is migrated from the source volume to the destination volume at the data migration pace; and a total estimated migration amount during a specified length of time from the data migration start date and time to an end of a specified time period, is compared with an actual data migration amount during that specified length of time, and the data migration pace is changed according to a difference between the total estimated data migration amount and the actual data migration amount during the specified length of time.

9. The data migration method according to claim 6, wherein in the fourth step, when the total estimated data migration amount during the specified length of time is equal to the actual data migration amount during the specified length of time, the data is migrated from the source volume to the destination volume while keeping the externally designated data migration pace designated.

10. A storage medium for storing a program carried out by a disk array apparatus, wherein the disk array apparatus has a source volume that is a source for data migration, and the disk array apparatus migrates the data to a destination volume that is a destination for the data migration, wherein the program makes the disk array apparatus execute:

a first step of calculating a separate access frequency of access to the source volume for each of a plurality of time periods, respectively, extending backwards in time from a data migration termination date and time when the data migration termination date and time is designated externally, each time period of the plurality of time periods being of a predetermined length of time;

a second step of calculating a separate estimated data migration amount for each respective time period of the plurality of time periods, based on the separate access frequency calculated for the respective time period in the first step; and a third step of calculating data a migration start date and time based on a collection of estimated data migration amounts for the plurality of time periods, as calculated in the second step.

11. The storage medium according to claim 10, wherein in the third step, a starting time for a time period when a total estimated data migration amount, as measured from the data migration termination date and time, becomes larger than the capacity of the source volume, is calculated as the data migration start date and time.

12. The storage medium according to claim 10, comprising a fourth step of migrating the data from the source volume to the destination volume when the data migration start date and time calculated in the third step occurs, wherein in the fourth step, if a data migration pace is designated externally, the data is migrated from the source volume to the destination volume at the data migration pace; and a total estimated migration amount during a specified length of time from the data migration start date and time to an end of a specified time period, is compared with an actual data migration amount during that specified length of time, and the data migration pace is changed according to a difference between the total estimated data migration amount and the actual data migration amount during the specified length of time.

13. The storage medium according to claim 12, wherein in the fourth step, when the total estimated data migration amount during the specified length of time is equal to the actual data migration amount during the specified length of time, the data is migrated from the source volume to the destination volume while keeping the externally designated data migration pace.

* * * * *